Jan. 4, 1955
L. H. SOMMER
2,698,859
TRIORGANOSILYLCYCLOPENTENEONES
Filed Aug. 14, 1953
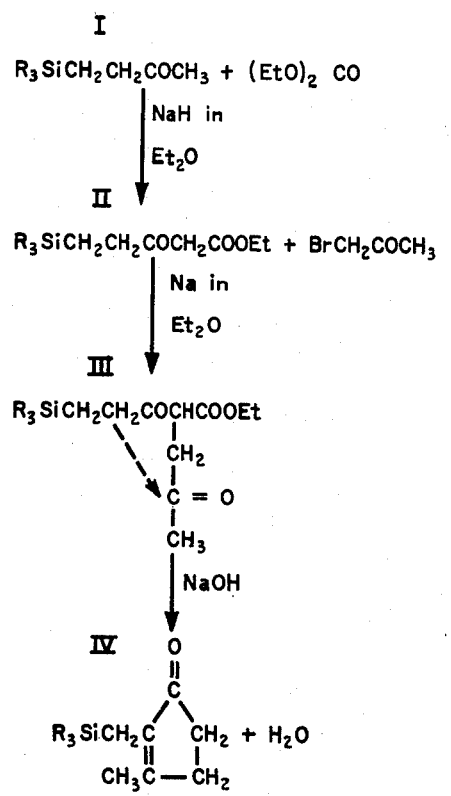
*INVENTOR.*
*LEO H. SOMMER*
BY Robert F. Fleming Jr.
*ATTORNEY*

United States Patent Office 2,698,859
Patented Jan. 4, 1955

2,698,859

TRIORGANOSILYLCYCLOPENTENEONES

Leo H. Sommer, State College, Pa., assignor to Dow Corning Corporation, Midland, Mich., a corporation of Michigan Application August 14, 1953, Serial No. 374,210

2 Claims. (Cl. 260—448.2)

This invention relates to compounds of the formula

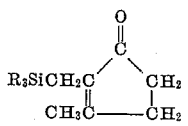

where R is a saturated aliphatic hydrocarbon radical or a monocyclic aryl hydrocarbon radical.

The preparation of the compositions of this invention is outlined in the accompanying drawing. Briefly, the synthesis involves the reaction of a 4-triorganosilyl-butane-2-one (I) with ethyl carbonate and sodium hydride in diethyl ether. The resulting product, an ethyl delta-triorganosilyl-beta-ketovalerate (II), is condensed with bromoacetone by reacting the two with sodium in diethyl ether to produce an ethyl alpha (beta-triorganosilyl-propionyl)-levulinate (III) which is then cyclicized with the elimination of water by treating it with a sodium hydroxide solution to give a 2-triorganosilylmethyl-3-methylcyclopent-2-ene-1-one (IV).

Compounds of the type I may be prepared by reacting silanes of the formula R₃SiCH₂Cl with sodium and an excess of acetoacetic ester in alcohol and thereafter hydrolyzing the resulting product with concentrated HCl. The preparation of these compounds is fully described in United States Patent 2,635,108.

For the purpose of this invention the R groups on the silicon atom can be any saturated aliphatic hydrocarbon radical such as methyl, ethyl, octadecyl, cyclohexyl or cyclopentyl, or any monocyclic aryl hydrocarbon radical such as phenyl, tolyl, or xylyl. It is to be understood that all of the R groups attached to a silicon atom can be alike or each R group can be a different radical. Thus, for example, the organosilyl groups can be trimethylsilyl, ethyldibutylsilyl or phenyltolyloctadecylsilyl.

The following example is illustrative only and should not be construed as limiting the invention which is properly delineated in the appended claims.

Example 48 g. of sodium hydride and 250 ml. of dry ether were placed in a flask under a dry nitrogen sweep and 259 g. of ethyl carbonate was added rapidly. The ether was brought to reflux and 144 g. of 4-trimethylsilylbutane-2-one (Me₃SiCH₂CH₂COCH₃) in 400 ml. of dry ether was added with stirring over a period of 10 hours. The reaction mixture was stirred and refluxed overnight. 125 ml. of glacial acetic acid was added followed by 400 ml. of water. The organic layer was separated, washed with water and 10% sodium bicarbonate solution and dried over anhydrous sodium sulphate. Upon distillation of the product ethyl delta-trimethylsilyl-beta-ketovalerate (Me₃SiCH₂CH₂COCH₂COOEt) was obtained.

To 88 g. of this ketovalerate and 300 ml. of dry ether there was added over a period of 15 minutes 9.2 g. of metallic sodium. After evolution of hydrogen had ceased, the mixture was refluxed for a short while to complete the reaction. The mixture was then cooled to 0° C. and a solution of 57.5 g. of freshly distilled bromoacetone in an equal volume of dry ether was added dropwise. The reaction mixture was warmed to room temperature and refluxed for one hour. A solution of 37 ml. of concentrated HCl in 100 ml. of water was added slowly. The ether layer was separated, dried over anhydrous sodium sulphate and the solvent was removed by distillation. There remained ethyl alpha-(beta-trimethylsilylpropionyl)-levulinate

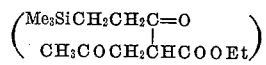

58 g. of this ethyl levulinate, 200 ml. of an 8% aqueous sodium hydroxide solution and 50 ml. of ethanol were mixed and refluxed for 1¾ hours. The reaction mixture was cooled and acidified with dilute acetic acid and extracted with two 50 ml. portions of ether. The ether solution was dried over anhydrous sodium sulphate and the product was distilled to give the compound 2-trimethylsilylmethyl-3-methylcyclopent-2-ene-1-one

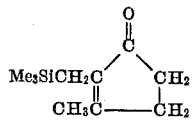

This compound has the following properties: boiling point 118° C. at 21 mm. pressure, $n_D^{20}$ 1.4827, $d^{20}$ 0.9323, $MR_D$ 58.74. The material was analyzed and found to contain 15.3% by weight silicon. The unsaturated ketone had a very pleasant odor.

That which is claimed is:
1. A compound of the formula

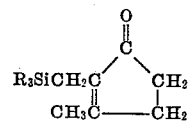

where R is selected from the group consisting of saturated aliphatic hydrocarbon radicals and monocyclic aryl hydrocarbon radicals.

2. 2 - trimethylsilylmethyl - 3 - methylcyclopent - 2-ene-1-one.

No references cited.